Sept. 6, 1966    A. F. DAVENPORT    3,270,439
DRIVER TRAINING APPARATUS
Filed Nov. 19, 1963

INVENTOR.
ALVAN F. DAVENPORT
BY
His ATTORNEY

Sept. 6, 1966  A. F. DAVENPORT  3,270,439
DRIVER TRAINING APPARATUS

Filed Nov. 19, 1963  4 Sheets-Sheet 3

INVENTOR.
ALVAN F. DAVENPORT
BY Manfred M. Warren
His ATTORNEY

Sept. 6, 1966     A. F. DAVENPORT     3,270,439
DRIVER TRAINING APPARATUS

Filed Nov. 19, 1963     4 Sheets-Sheet 4

INVENTOR.
ALVAN F. DAVENPORT
BY
His ATTORNEY

United States Patent Office 3,270,439
Patented Sept. 6, 1966

3,270,439
DRIVER TRAINING APPARATUS
Alvan F. Davenport, 3415 May Road, Richmond, Calif.
Filed Nov. 19, 1963, Ser. No. 324,643
12 Claims. (Cl. 35—11)

The invention relates to driving simulator apparatus which may be used in a classroom for simulated automobile driver training, as well as to teach certain phases of traffic safety.

An object of the present invention is to provide a driver training apparatus which a person can in less time be more thoroughly and economically trained in the skills required of safe motor vehicle operation.

Another object is to provide an apparatus in which all of the maneuvers possible in an actual automobile may be made such as in right turns, left turns, U-turns, turnabouts, lane changes, backing and parking precisely and positively over a course entirely determined by the selected steering wheel movements of the operator.

Another object is to provide a driver training apparatus in which a beginning student can learn each of the basic operations such as simple steering, braking and accelerating individually practiced.

Another object is to provide a driver training apparatus which can also effectively and precisely measure the skills learned by the student during any phase of the instruction.

A further object is to provide a driver trainer apparatus which may be inexpensively manufactured and assembled from a minimum of durable parts and which will give long and trouble free service.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (four sheets):

Figure 1:
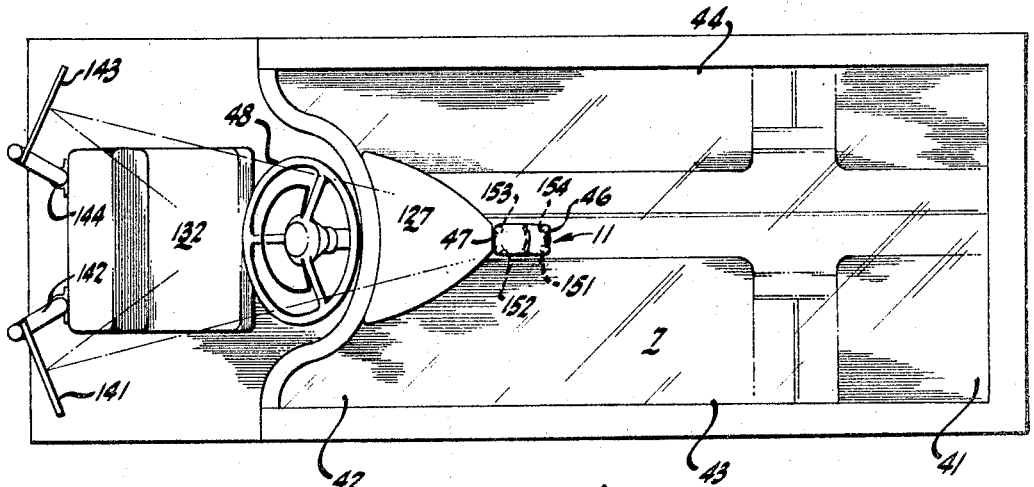
FIGURE 1 is a plan view of a driver training apparatus constructed in accordance with the present invention.
Figure 2:
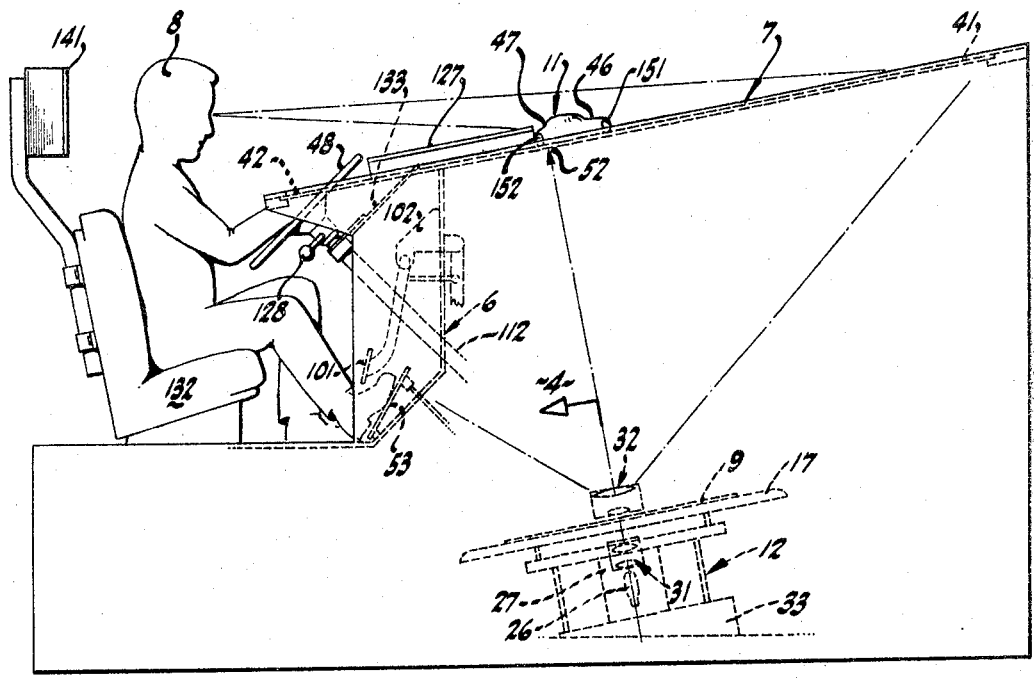
FIGURE 2 is a side elevational view of the apparatus showing portions of some of the controls.
Figure 3:
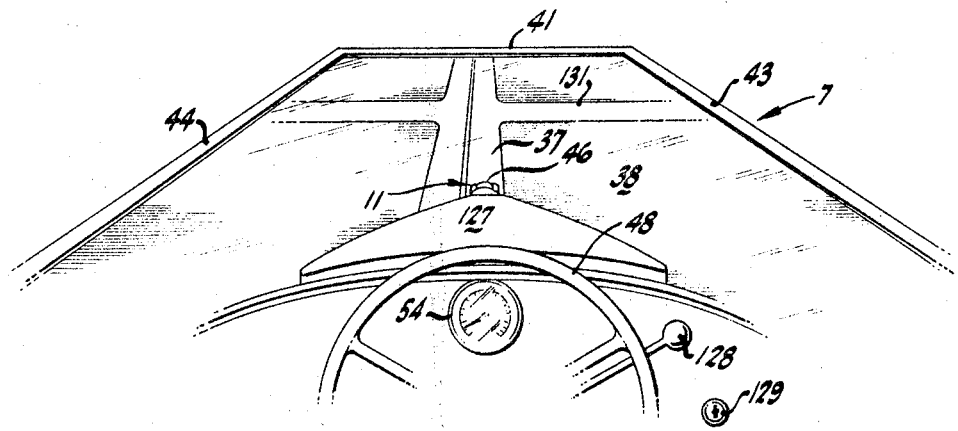
FIGURE 3 is a partial rear elevational view of the apparatus.
Figure 4:
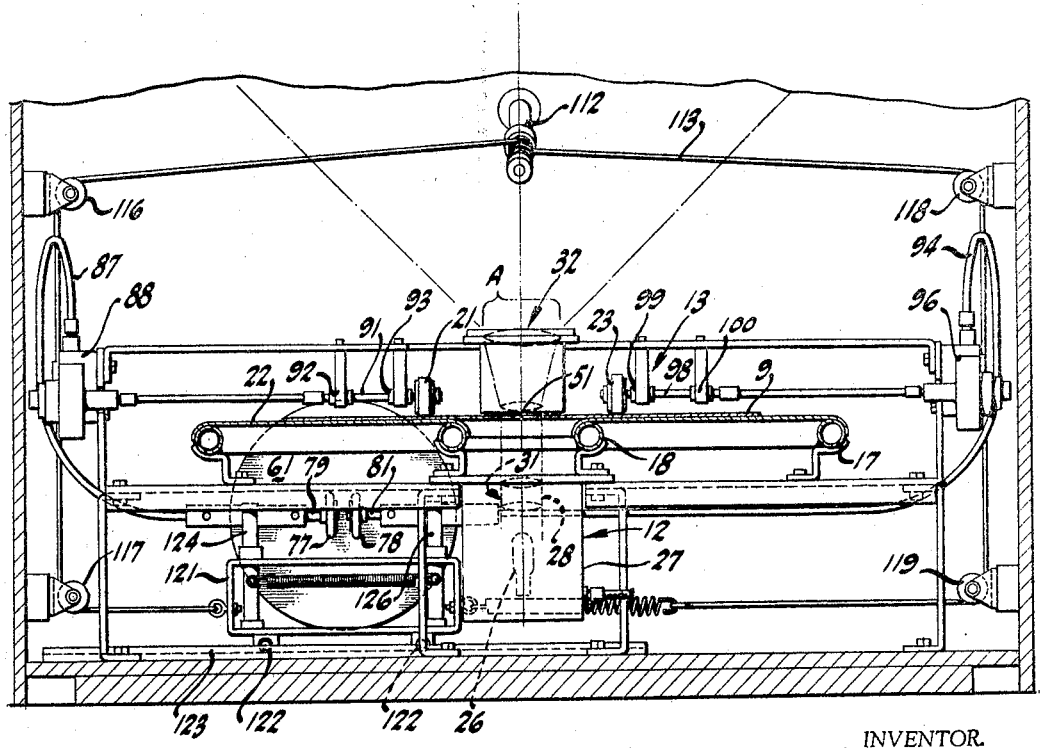
FIGURE 4 is a partial front elevational view of the apparatus, on an enlarged scale with some parts removed for clarity.
Figure 5:
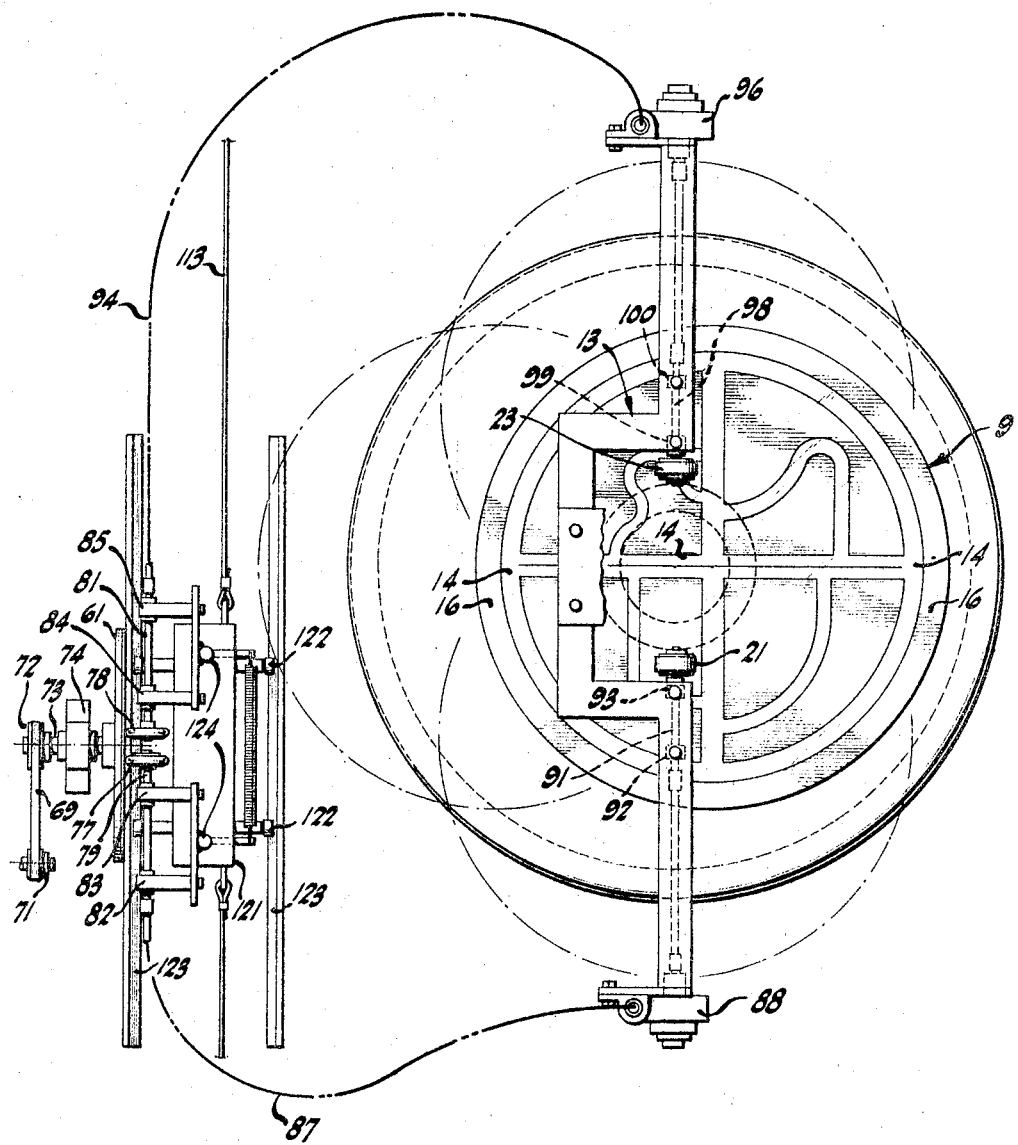
FIGURE 5 is a plan view of selected portions of the apparatus with one part in phantom indicating some of its positions.
Figure 6:
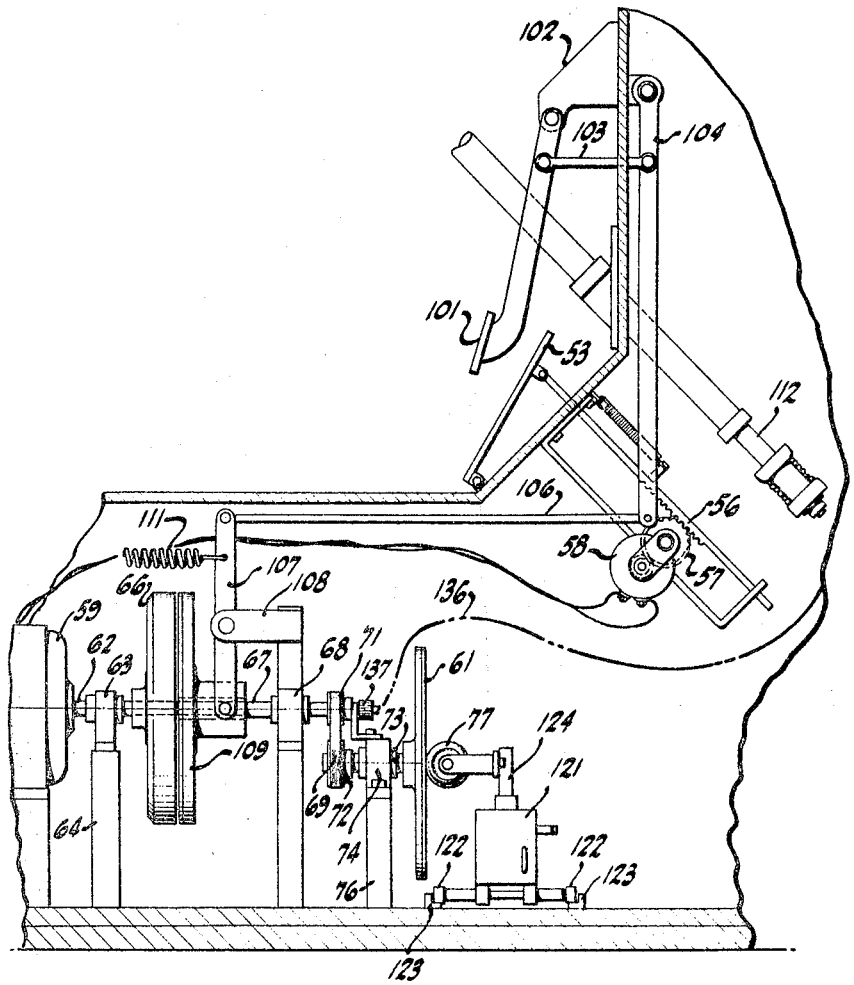
FIGURE 6 is a partial side elevational view with parts removed for greater clarity.

Prior driving simulators heretofore used have approached the visual realism of the road scene as viewed by an automobile driver, but none have been capable of faithfully simulating the relative movement of the car and roadway when the driver operates the steering, braking and accelerating controls. In applicant's device, there is a positiveness and preciseness of steering and an absence of any sliding and remote control sensation when negotiating curves which are found in all prior art devices.

The driving simulator apparatus of the present invention consists briefly of an operator engageable steering control 6, a screen 7 positioned for viewing by the operator 8, scene means 9 providing a road scene mounted for lineal and rotary displacement, vehicle means 11 representing the vehicle being driven visually superimposed on screen 7, projection means 12 projecting the image of a portion of the road scene onto the screen in juxtaposition to the vehicle, and motorized scene control means 13 connected to the scene means for advancing the scene means thereby causing the road scene image to move with respect to the vehicle means and being connected to the steering control for manually controlled rotation of the road scene means permitting the operator to track the vehicle on the moving road scene image.

The above mentioned scene means may consist of a sheet of plastic or glass having contrasting transparent or translucent and opaque portions representing the road and landscape. As here shown, transparent sections 14 represent the roadway and opaque sections 16 represent off the road terrain. Sheet 9 may be mounted on an outer supporting ring 17 and an inner support ring 18 and between laterally disposed drive wheels 21 and 23 and support 22.

Projection means 12 is located beneath the supporting rings 17 and 18 and specifically between drive wheels 21 and 23 and consists here of an enclosure 27 mounted on support 33 and formed with an aperture 28. Condensing lens system 31 and projection lens system 32 focus the rays of light source 26 on screen 7. A roadway image 37 corresponding to the transparent or translucent portion 14 of sheet 9 and an off the road image 38 corresponding to the opaque or different color translucent section 16 of road scene means 9 is thus projected onto screen 7.

An important feature of the present invention is the projection of a roadway image 37 of substantially constant width on screen 7. The operator actually sees the road in perspective only because of the difference in distance of the front portion 41 and the rear portion 42 from the operator. The fact that the roadway may be projected in this manner permits a simplified projection and scene means. More importantly, it cooperates with the other structure in affording the precise steering and tracking. Screen 7 may consist of a plate of translucent plastic or ground glass mounted in a frame having a front side 41, a back side 42 and lateral sides 43 and 44. Screen 7 may be mounted in front of driver 8 and in a horizontal or slightly inclined position permitting the operator to see vehicle means 11 and the full portion of the screen.

The vehicle means 11 here consists of a miniature automobile having a front portion 46 and a rear portion 47 aligned parallel to the elongated axis of screen 7 with the front portion 46 pointed toward front side 41 of the screen.

From the foregoing, it is to be understood that the vehicle 11 remains stationary while roadway image 37 moves from the front 41 to the rear 42 of screen 7. The realism is enhanced by placing the simulator in a semi-darkened room so that the operator seated in chair 132 behind dashboard 133 in the driving compartment sees only the roadway and the darkened off the highway areas 38 in relation to vehicle 11. The illusion of actually driving is further enhanced by the positive relative movement of the vehicle 11 and the roadway 37 in response to the turning of the steering wheel 48. This is accomplished by mounting projection means 12, scene means 9 and motorized scene control means 13 so that the image of the road scene pivots about a point located under substantially the rear center portion of vehicle 11. In the apparatus herein shown, projection means 12 casts an image of an area having a center point 51 located midway between drive wheels 21 and 23. Center point 51 appears as image point 52 located beneath the rear portion 46 of vehicle 11. In applicant's apparatus, there is no "sliding" effect experienced when the operator makes a turn. The sensation of "sliding" in making turns in other apparatus results from the fact that the roadway image pivots about points located other than between the rear wheels of the automobile.

The speed of auto 11 is controlled by an accelerator control which causes the roadway image to move toward the operator at a fast or slow rate as a function of the displacement of an accelerator pedal 53. It has been found, furthermore, that by preparing the road scene with crossroads and other markings beside the roadway scene, the illusion of speed is heightened. In addition, the device can be equipped with a speedometer indicator 54 to indicate a relative speed.

The speed at which roadway image 37 travels across screen 7 is a direct function of the speed of rotation of drive plate 61. Plate 61 is here controlled by the accelerator control which consists of a rack 56 connected to an accelerator pedal 53 and pinion gear 57 which operates a rheostat 58 controlling the current to motor 59. Motor 59 is connected to plate disc 61 by shaft 62 journalled in bearing 63 mounted on support 64. Shaft 62 is connected to fly wheel 66 which is in turn connected to shaft 67 journalled in bearing 68. Torque is transmitted to shaft 73 by belt 69 connecting sheave 71 mounted on shaft 67 and sheave 72 mounted on shaft 73 journalled in bearing 74 mounted on support 76, and shaft 73 is connected to plate 61. The speedometer cable 136 may be appropriately connected to shaft 67 by a coupling 137. Drive plate 61 drives scene control means 13 which here consists of a pair of control wheels 77 and 78 in frictional engagement with plate disc 61 and journalled for rotation on shafts 79 and 81, respectively, which are in turn journalled in bearings 82, 83, 84 and 85. Control wheel 77 is connected to driving control wheel 21 by shaft 79 coupled to flexible shaft 87 which is in turn connected to gear reducer 88 coupled to shaft 91 journalled for rotation in bearings 92 and 93 and with driving control wheel 21 mounted thereon. Drive wheel 78 is in like manner connected to control wheel 23 by means of shaft 81, flexible drive shaft 94, gear reducer and reverser 96, coupled to shaft 98 and journalled for rotation in bearings 99 and 100. Drive wheels 21 and 23, as heretofore explained, frictionally engage sheet 9.

In order to effect lineal movement of sheet 9, control wheels 77 and 78 are mounted equidistant on opposite sides of the center of rotation of drive plate 61. The two control wheels rotate in opposite directions, but gear reducer 96 includes an extra gear (not shown) for reversing the direction of rotation of shaft 98 so that drive wheels 21 and 23 are driven in the same direction for moving sheet 9.

Turning of roadway image 37 on screen 7 is effected by manual displacement of the steering control means which here consists of a steering wheel 48, a steering wheel column 112 connected to cable 113 mounted on sheaves 116, 117, 118, and 119, and connected to carriage 121 equipped with four wheels 122 which roll on track 123. Supports 124 and 126 connected to carriage 121 support shafts 79 and 81 on which drive wheels 77 and 78 are mounted. When drive wheels 77 and 78, which are in frictional engagement with plate 61, are moved laterally the wheels rotate at different speeds depending upon their displacement from the center of rotation of plate 61. The speed of drive wheels 21 and 23 are a function of control wheels 77 and 78 and sheet 9 is rotated when the drive wheels rotate at different speeds. When control wheels 77 and 78 are displaced to the same side of the center of rotation on the plate disc, the drive wheels 21 and 23 rotate in opposite directions and the speed of the turning of the sheet 9 is increased. Thus, very sharp turns can be negotiated and in fact, the steering mechanism can be arranged so as to simulate the turning ability of any motor vehicle. Stop limits, now shown, can be placed on the tracks 123 or other places in the mechanism to limit the turning of steering wheel 48.

The present device is uniquely adapted for the inclusion of a brake control since merely slowing the rotational speed of drive plate 61 results in a slowing of the movement of the road scene image. The braking control here consists of a manually engageable brake pedal 101 pivoted at one end to bracket 102, a connecting rod 103 joining brake pedal 101 and lever 104 pivoted at one end to bracket 102 and joined to long connecting rod 106 at the other end, and lever 107 pivoted to bracket 108 for moving brake shoe 109 into engagement with fly wheel 66. Slowing of fly wheel 66 slows the rotational speed of plate 61 through connections heretofore described. Spring 111 connected to lever 107 biases brake shoe 109 to a disengaged position.

Still another feature of applicant's device is the ability to practice backing and parking. The parking maneuver is accomplished by simply removing shield 127 from screen 7 thus permitting the operator to see a portion of the roadway image behind vehicle 11. To reverse the direction of the road scene, a switch (not shown) for reversing motor 59 is attached to and actuated by gear shift lever 128 in the normal reverse position of the lever.

In order to practice straight backing, some minor rearrangement of the apparatus is required. Car 11 is reversed 180° in direction so that the front of the auto faces the driver as he faces the screen. In addition, the switch for reversing motor 59 is constructed so that upon actuation for backing practice the road travels from the front 41 of the screen to the back when the gear shift lever is in the normal position for reverse. Conversely, the image moves from the rear to the front of the screen when the gear shift lever is in the normal forward driving positions. For straight backing, a mirror 141 is attached to the back of the operator's chair 132 by support 142. The mirror is mounted at an angle so that when the driver turns his head and looks into the mirror, he will view the automobile 11 and a portion of the roadway image in front and in back of the car 11. Because the direction of the car is reversed, the illusion of backing is accomplished without a reversal in direction of motor 59; the roadway image travels from front edge 41 to the back edge 42 as in normal forward driving. An additional mirror 143 and support 144 is attached to seat 132 to permit the operator to look over either his right or left shoulder in viewing vehicle 11.

In operation, the simulator can be started in operation by turning on key switch 129 which activates motor 59. Operator 8 depresses accelerator pedal 53 to start the vehicle 11 in forward "motion." With the steering wheel 48 set for straight ahead movement, and drive wheels 77 and 78 correspondingly positioned equidistantly on opposite sides of the center of rotation of plate 61, depressing accelerator pedal 53 causes motor 59 to rotate plate 61 causing control wheels 77 and 78 to turn at the same speed but in the opposite directions. The control wheels are connected to the drive wheels 21 and 23 through gear reducer 88 and gear reducer and reverser 96, thus causing the drive wheels to be rotated in the same direction and to cause sheet 9 to move forwardly on mounting rings 17 and 18. The image of roadway 37 is projected onto screen 7 by projector 12 in juxtaposition to vehicle 11 and moves normally from the front 41 to the rear 42 of screen 7.

Increased displacement of accelerator pedal 53 causes the motor and all parts described immediately above to rotate at a faster speed thus producing the illusion of "driving" at increased speed. The reading on the speedometer 54 will be increased and the image of cross streets 131 will move toward the operator at greater speed further enhancing the illusion of speed.

To accomplish braking, the operator merely depresses brake lever 101 which moves brake shoe 109 against fly wheel 66 thus reducing the speed of plate 61 and reducing thereby the speed of the control and drive wheels which move sheet 9.

In order to make a turn, the operator merely turns steering wheel 48 which causes carriage 121 to move control wheels 77 and 78 from their equidistant position on plate 61. Thus displacement of the spaced control wheels causes them to rotate at different speeds which in turn causes drive wheels 21 and 23 to rotate at different speeds and thereby causes the sheet 9 to be turned.

Backing is accomplished merely by reversing the rotation of motor 59 which reverses the direction of plate 61 and drive and control wheels.

Where only the front portion 46 of vehicle 11 is seen and the roadway image 37 is relatively wide, the miniature car appears to be a portion of the front end of the car which the operator is driving, and he uses the miniature car as a reference point in locating himself in relation to the roadway image 37, as one does in driving an actual automobile. The end effect is that the operator believes himself to be driving the front end of the miniature car.

The noise level and vibration level is known to be a factor in judging the speed of an automobile. Similar conditions are created in the present device because of the increased noise of the motor and gearing as the accelerator is depressed and an increased vibration caused by electric motor 59. The illusion produced by the present apparatus is that the operator is within an actual car and is driving the car 11 upon roadway image 37. This effect is heightened by the disposition of screen 7 forwardly and away from the drive so that perspective of roadway 37 and cross streets 31 as they move to the operator is strikingly similar to what is actually seen by the driver of an actual automotive vehicle.

Still another important feature of applicant's invention is the time delay in effecting an increased speed upon depressing the accelerator or in stopping after depressing the brake pedal. Realism is lost in simulators which have instantaneous acceleration or stopping. In the present invention, the time delay is accomplished by introducing a heavy fly wheel 66 operatively connected to disc 61 which creates an inertia to prevent instantaneous acceleration and braking.

Signs, markings, directions, off the road scenery and other vehicles—parked and oncoming—can be easily included on the transparency to heighten the illusion and improve the training of an operator. In addition, instructions as to the proper way of executing all driving maneuvers such as turns, lane changes and negotiating a particular traffic problem may be printed directly on the transparency sheet 9. Those instructions can be laid out in a short series of words along the roadway so that they can be easily read as the operator operates the simulator. Furthermore, the use of a flat sheet permits the operator to accelerate, stop, turn and back with complete freedom as hereinabove described without the use of a complicated apparatus to move and project a three dimensional scene.

As a means of checking the operator's ability to stay within the roadway boundaries, the present invention is provided with means on the sides of vehicle 11 which transmit a signal each time the vehicle goes off roadway 37. The apparatus necessary to accomplish this checking control here consists of four photoelectric cells 151, 152, 153, and 154 located on the four corners of vehicle 11. The car is plugged into a four pronged receptacle (not shown) which carries the signals of each of the four photoelectric cells to a counter (not shown). The counter used herein is a ratchet type counter which is manufactured by Veeder-Root Counter, Inc. The photoelectric cells transmit a signal each time a change in light intensity is sensed, as for example when the photoelectric cell passes from the light colored roadway to the darker off the highway area. The counter is equipped with a pulsing device (not shown) which records the length of time that the vehicle is off the highway. The counter records the number of times each cell was off the road. Thus, an instructor can evaluate the operator's score and determine and correct errors in driving such as beginning a turn too soon, beginning a turn too late, improper steering, etc.

I claim:

1. A driving simulator apparatus including an operator's seat comprising, an operator engageable steering control, a substantially horizontal screen positioned for viewing by the operator, scene means providing a road scene mounted for lineal and rotary displacement, miniature vehicle means representing the vehicle being driven mounted on said screen in fixed relation thereto, right angular projection lens means projecting the image of a portion of said road scene onto said screen, the center point of said image being projected at a point located directly beneath said vehicle means and said image rotating about said center point, masking means mounted on said screen covering a portion of said image to the rear of said vehicle means, and motorized scene control means connected to said road scene means for advancing said scene means thereby causing said road scene image to move with respect to said fixed vehicle means and being connected to said steering control for manually controlled rotation of said road scene means for permitting the operator to track said vehicle means on said moving road scene image.

2. A driving simulator apparatus including an operator's seat comprising, operator engageable steering, brake and accelerator controls, an elongated substantially horizontal screen positioned forwardly of the operator for viewing a sheet having varying degrees of transparency depicting a roadway and a road scene mounted for lineal and rotary displacement miniature, vehicle means representing a vehicle being driven mounted on said screen in fixed relation thereto, right angular projection lens means projecting the image of a portion of said sheet onto said screen the center point of said image being projected at a point located directly beneath said vehicle means and said image rotating about said center point, masking means mounted on said screen covering a portion of said image to the rear of said vehicle means, said sheet and said projection means providing the projection of a roadway image of substantially constant width, and motorized sheet control means connected to said sheet, said accelerator and said brake for accelerated and decelerated advancement of said sheet thereby causing said roadway and road scene image to move with respect to said fixed vehicle means and being connected to said steering control for manually controlled rotation of said road scene means for permitting the operator to track said vehicle means on said moving roadway image.

3. A driving simulator apparatus comprising, manually displaceable steering and accelerator controls, a screen positioned for viewing by the operator, scene means providing a road scene mounted for lineal and rotary displacement, vehicle means representing a vehicle being driven visually superimposed on said screen, projection means projecting the image of a portion of said road scene onto said screen in juxtaposition to said vehicle means, a pair of spaced drive wheels engaging said road scene means at opposite sides of said portion, motor means connected to said accelerator controls, control means operatively coupling said motor means to said pair of drive wheels for driving said wheels at identical speeds relative to each other, the absolute magnitude of the speeds varying as a function of displacement of said accelerator control to effect lineal displacement of said scene means thereby causing said road scene image to move with respect to said vehicle means and for driving said wheels at different relative speeds, the magnitude of the relative difference varying as a function of displacement of said steering control thereby to effect rotary displacement of said scene for permitting the operator to track said vehicle means on said moving road scene image.

4. A driving simulator apparatus comprising, manually displaceable steering and accelerator controls, a screen positioned for viewing by the operator, scene means providing a road scene mounted for lineal and rotary displacement and having a drive surface, vehicle means representing a vehicle being driven visually superimposed on said screen, projection means projecting the image of a portion of said road scene onto said screen in juxtaposition to said vehicle means, a pair of drive wheels engaging said surface on opposite sides of said portion, a drive plate journalled for rotation about an axis, a motor operatively connected to said accelerator controls and said plate, a pair of control wheels mounted in frictional engagement with and driven by said drive plate and being connected to and driving said drive wheels at identical speeds relative to each other, the absolute magnitude of the speeds varying as a function of displacement of said accelerator control to effect lineal displacement of said scene means thereby causing said road scene image to move with respect to said vehicle means, at least one of said control wheels being mounted for movement radially of said plate for effecting a speed differential between said control wheels and said drive wheels, and means connected to said steering control and said last named control wheel for effecting said radial displacement of the latter, as a function of displacement of said steering control thereby to effect rotary displacement of said scene for permitting the operator to track said vehicle means on said moving road scene image.

5. A driving simulator apparatus comprising, manually displaceable steering and accelerator controls, a screen positioned for viewing by the operator, a transparent sheet providing a road scene mounted for lineal and rotary displacement and having a drive surface, vehicle means representing a vehicle being driven visually superimposed on said screen, projection means projecting the image of a portion of said road scene onto said screen in juxtaposition to said vehicle means, a pair of drive wheels engaging said surface on opposite sides of said portion for effecting said lineal and rotary displacement when the peripheral speeds of said wheels are the same and different respectively, a drive plate journalled for rotation about an axis, an accelerator controlled motor connected for driving said plate at rotational speeds varying as a function of displacement of said accelerator control, a pair of control wheels mounted in frictional engagement with and for driving by said plate and being connected to and for driving said drive wheels, at least one of said control wheels being mounted for movement radially of said plate for effecting a peripheral speed differential between said control wheels and said drive wheels, and means connected to said steering control and said last named control wheel for effecting said radial displacement of the latter as a function of the manual displacement of said steering control.

6. A driving simulator apparatus comprising, manually displaceable steering and accelerator controls, a screen positioned for viewing by the operator, a transparent sheet providing a road scene mounted for lineal and rotary displacement and having a drive surface, vehicle means representing a vehicle being driven visually superimposed on said screen, projection means projecting the image of a portion of said road scene onto said screen in juxtaposition to said vehicle means, a pair of drive wheels engaging said surface on opposite sides of said portion for effecting said lineal and rotary displacement when the peripheral speeds of said wheels are the same and different respectively, at drive plate journalled for rotation about an axis, an accelerator controlled motor connected for driving said plate at rotational speeds varying as a function of displacement of said accelerator control, a pair of control wheels mounted in frictional engagement with and for driving by said plate and being connected to for driving said drive wheels, at least one of said control wheels being mounted for movement radially of said plate for effecting a peripheral speed differential between said control wheels and said drive wheels, and means connected to said steering control and said last named control wheel for effecting said radial displacement of the latter as a function of the manual displacement of said steering control.

7. A driving simulator apparatus comprising, manually displaceable steering and accelerator controls, a screen positioned for viewing by the operator, scene means providing a road scene mounted for lineal and rotary displacement, vehicle means representing a vehicle being driven visually superimposed on said screen, projection means projecting the image of a portion of said road scene onto said screen in juxtaposition to said vehicle means, a drive plate journalled for rotation about an axis, motor means connected to said drive plate and said accelerator control for rotation of said drive plate at speeds varying as a function of the displacement of said accelerator control, a pair of coaxially spaced control wheels journalled for rotation on an axis substantially perpendicular to and intersecting said plate axis and positioned equidistant on opposite sides of said plate axis and in frictional engagement therewith for rotation at identical speeds varying as a function of displacement of said accelerator control, said pair of control wheels being mounted for axial displacement across the face of said plate for rotation at different speeds as a function of the displacement of said steering control, a pair of coaxially spaced drive wheels connected to said control wheels and spaced for engaging said scene means at opposite sides of said portion for lineal movement of said scene means as a function of the speed of said control wheels and the displacement of said accelerator and for rotary displacement of said scene means as a function of the respective speeds of each of said control wheels and the displacement of said steering control thereby causing said road scene image to move with respect to said vehicle means for permitting the operator to track said vehicle means on said moving road scene image.

8. A driving simulator apparatus comprising, operator engageable accelerator and steering controls including a steering wheel manually engageable gear shift means having forward and reverse positions; an elongated screen positioned adjacent said steering wheel for viewing by the operator; scene means providing a road scene mounted for lineal and rotary displacement; vehicle means representing a vehicle being driven visually superimposed on said screen aligned substantially parallel to and straddling the axis of the elongated dimension of said screen and having front and rear portions; projection means projecting the image of a portion of said road scene onto said screen rearwardly and forwardly of said vehicle means and in juxtaposition thereto; motor means having forward and reverse directions operatively connected to said accelerator control and said gear shift means; scene control means connected to said motor means, said steering control means and said road scene means for rotating and advancing said scene means when said gear shift is in said forward position and reversing the direction of rotation and lineal direction of said scene means when said gear shift means is in said reverse position thereby causing said road scene image to move with respect to said vehicle means and permitting the operator to track said vehicle means on said moving road scene image in forward driving and backing; and a removeable shield overlaying a portion of said screen for permitting the operator upon removal of said screen to see a portion of said screen behind said vehicle to enable practice in parking.

9. A driving simulator apparatus comprising, operator engageable steering, braking and accelerator controls; an elongated inclined screen positioned forwardly of said operator for viewing; a transparent sheet providing a road scene mounted for lineal and rotary displacement; vehicle means representing a vehicle being driven visually superimposed on said screen; projection means projecting the image of a portion of said road scene onto said screen in juxtaposition to said vehicle means; said sheet and said projection means providing the projection of a roadway image of substantially constant width on said screen; a drive plate mounted for rotation about an axis; motor means connected to said drive plate and said accelerator control for rotation of said drive plate at speeds varying as a function of the displacement of said accelerator control, a pair of coaxially and fixedly spaced control wheels journalled for rotation on an axis substantially perpendicular to and intersecting said plate axis and positioned equidistant on opposite sides of said plate axis for frictional engagement with said drive plate for rotation at identical speeds varying as a function of displacement of said accelerator control and mounted for axial displacement for driving at different speeds as a function of the displacement of said steering control; a pair of coaxially and fixedly spaced drive wheels connected to said control wheels and spaced for engaging said scene means at opposite sides of said portion and for lineal movement of said scene means as a function of the speeds of said control wheels and the displacement of said accelerator and for rotary displacement of said scene means as a function of the respective speeds of each of said control wheels and the displacement of said steering control thereby causing said road image to move with respect to said vehicle means thereby permitting the operator to track said vehicle means on said moving road scene image and said projection means, scene means and drive wheels mounted and adapted for controlled turning of said road scene image about a point located midway between the rear wheels of said vehicle.

10. A driving simulator apparatus comprising, manually displaceable steering and accelerator controls, a screen positioned for viewing by the operator, scene means providing a road scene mounted for lineal and rotary displacement and having a drive surface, vehicle means representing a vehicle being driven visually superimposed on said screen, projection means projecting the image of a portion of said road scene onto said screen in juxtaposition to said vehicle means, a pair of drive wheels engaging said surface on opposite sides of said portion for effecting said lineal and rotary displacement when the peripheral speeds of said wheels are the same and different respectively, a drive plate journalled for rotation about an axis, an accelerator controlled motor connected for driving said plate at rotational speeds varying as a function of displacement of said accelerator control, a flywheel operatively connected to said drive plate and motor for introducing a time delay in acceleration or deceleration to different relative speeds, and steering controlled speed differential means connected to said wheels for effecting a peripheral speed differential varying as a function of displacement of said steering control.

11. A driving simulator apparatus comprising, an operator engageable steering control, a substantially horizontal screen positioned for viewing by the operator, manually engageable gear shift means having forward and reverse positions; scene means providing a road scene mounted for lineal and rotary displacement miniature, vehicle means representing the front and rear of the vehicle being driven reversibly mounted on said screen right angular, projection lens means projecting the image of a portion of said road scene onto said screen in juxtaposition to said vehicle means, a mirror screen mounted rearwardly of the driver adjustable for viewing said vehicle in reversed position in practicing backing, motor means having forward and reverse directions operatively connected to said gear shift means, scene control means connected to said motor means, said steering control means and said road scene means for rotating and advancing said scene means when said gear shift is in said forward position and reversing the direction of rotation and lineal direction of said scene means when said gear shift means is in said reverse position thereby permitting the operator to track said vehicle means on said moving road scene image in forward driving and parking practice, and manually operable switch means operatively connected to said gear shift means causing said scene control means to move said scene means as though said gear shift means were in said forward position when said gear shift means is actually in said reverse position for practice in using a rear view mirror for backing.

12. A driving simulator apparatus comprising, an operator engageable steering control, a substantially horizontal screen positioned for viewing by the operator, scene means providing a road scene mounted for lineal and rotary displacement miniature, vehicle means representing the vehicle being driven mounted on said screen right angular, projection lens means projecting the image of a portion of said road scene onto said screen in juxtaposition to said vehicle means photo, sensing means mounted on said vehicle for transmitting a signal when said vehicle is not on said roadway image, means receiving and totalling the signals from said sensing means, and motorized scene control means connected to said road scene means for advancing said scene means thereby causing said road scene image to move with respect to said vehicle means and being connected to said steering control for manually controlled rotation of said road scene means for permitting the operator to track said vehicle means on said moving road scene image.

References Cited by the Examiner

UNITED STATES PATENTS

| | | | |
|---|---|---|---|
| 2,046,202 | 6/1936 | Miles | 35—11 |
| 2,341,312 | 2/1944 | Chedister | 25—11 |
| 2,742,714 | 4/1956 | Allgaier | 25—11 |
| 2,935,794 | 5/1960 | Durham | 35—11 |

EUGENE R. CAPOZIO, *Primary Examiner.*

SHELDON M. BENDER, *Assistant Examiner.*